June 26, 1973 D. M. FORSYTHE ET AL 3,741,853

REPAIR OF WOOD PANELS

Filed Aug. 6, 1970

INVENTORS
DAVID M. FORSYTHE
WILLIAM J. RUNCKEL

BY

ATTORNEYS

United States Patent Office 3,741,853
Patented June 26, 1973

1

3,741,853

REPAIR OF WOOD PANELS

David M. Forsythe, Clackamas, and William J. Runckel, Portland, Oreg., assignors to Publishers Paper Co., Oregon City, Oreg.

Filed Aug. 6, 1970, Ser. No. 61,769
Int. Cl. B32b *3/02, 35/00*
U.S. Cl. 161—41 7 Claims

ABSTRACT OF THE DISCLOSURE

A plywood panel having a filled region of repair therein, and a method of filling such region. A filler composition is used comprising a mixture of from 3 to 10% by weight comminuted cork with the remainder being essentially a thermosetting resin binder. The cork has a particle size which passes a 20 mesh screen and is retained on a 40 mesh screen. In the filling of a region of repair, the filler composition is poured into a previously prepared hole and allowed to cure. During curing, particles of cork float to the surface of the filler composition, producing stratification of the mixture, with a layer rich in cork adjacent the surface of the region of repair.

This invention relates to the production of repaired plywood panels, and to a novel filler composition and a method for its use.

In the repair of an imperfection, such as a knothole in the face veneer of a plywood panel, principally two approaches have been used to date. Patching has been performed by cutting out the defective area in the face veneer, and substituting a patch of equal size cut from nondefective wood. Because of differences in shrinkage characteristics, grain structure, etc., patching cannot be performed with permanent concealment as to where the knot at one time existed. In some panels, knots have been removed with the hole then being filled with resin. Here there is no attempt to eliminate the appearance of a knot, but only an attempt to produce a sealed filled region which will stand up over a period of use.

One problem which arises when a region of repair is filled with resin, is that the cured resin is hard and cannot be finished like surrounding wood. As a result, the filled area tends to stand out from the remainder of the panel, by having a certain sheen and/or being raised somewhat from the surrounding surface. When a stain is applied, the problem of sheen is accentuated. The usual resin, furthermore, is expensive.

To overcome some of these problems, some have proposed introducing sawdust into the filler composition along with the resin. However, a reaction frequently occurs between the sawdust and the resin, causing an objectionable color change in the filler composition. Further, sawdust is an open-celled material, and quickly becomes saturated with resin when incorporated with a resin mix. Thus, a region filled with a resin-sawdust mixture is subject to the same problems as one filled with pure resin, i.e., a fill results which is difficult to stain, which has a sheen different from surrounding area, and which is difficult to sand or otherwise texture.

A general object of this invention is to provide a plywood panel featuring an improved repaired region therein. Such region is easily sanded, brushed, or otherwise worked or finished to resemble the wood surrounding it.

Another object is to provide such a panel, wherein the repaired region has stain retention characteristics similar to that of the wood surrounding it.

2

Yet another object is to provide such a panel wherein a cork and resin mixture is used as a filler composition, and such on hardening stratifies to form a layer adjacent the surface of the panel which has a substantially greater amount of cork than an underlying layer adjacent the base of the prepared region. The cork adjacent the surface of the panel provides good machinability and staining characteristics, and the underlying layer which contains more resin adheres well and produces a good seal with the bottom and sides of the cavity which contains the filler.

Still another object of the invention is to provide a novel method of repairing the face veneer in a panel.

These and other objects and advantages will become more fully apparent as the invention is described below in conjunction with the drawings, wherein.

Figure 1:
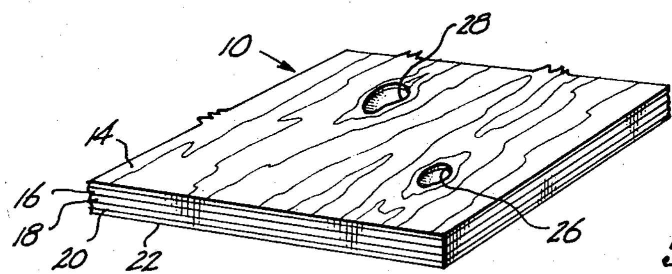
FIG. 1 is a perspective view of a portion of a multiple-ply plywood panel.
Figure 2:
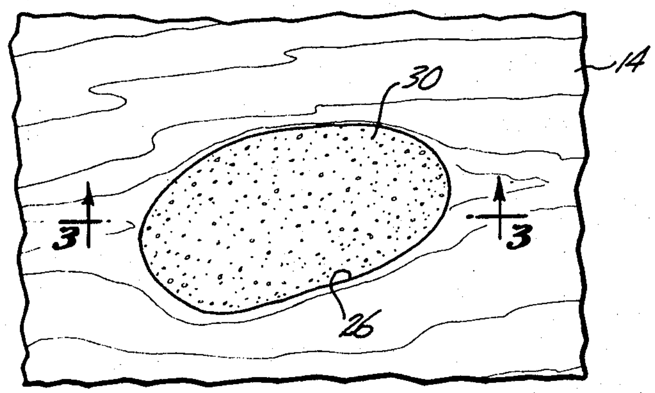
FIG. 2 is an enlarged view of a portion of its face.

To produce a plywood panel such as that indicated generally at 10 in FIG. 1, multiple veneer layers, such as those indicated at 14, 16, 18, 20, 22 are layed one on top of the other and glued together in face-to-face contact. Veneers, or veneer sheets 14, 22 form opposite faces of the panel and are sometimes referred to as a face and a back, respectively, and the remainder of the veneer layers are usually referred to as the cores in the panel. The usual glue lines unite or join together the veneer layers in the panel.

The face and back veneers in such a panel may have defects therein, such as knots. In the case of the face veneer, for esthetic reasons and to increase the soundness of the surface of the panel, these may be removed and the hole left filled with a filler. Generally, such a defect is removed prior to laying up of the panel. Holes produced by the removal of knots in face veneer sheet 14 are indicated at 26 and 28 in FIG. 1.

In repairing the face veneer of the panel, the filler composition of the invention, indicated generally at 30, may be introduced directly into the knothole with such overlying and bonding to the glue line 32 which unites face veneer 14 to core 16 where such extends under the knothole. However, a better seal of the region repaired and a better bond with the underlying core is produced if a cavity is prepared in a glue line coextensive with the knothole by first routing out the glue line. With this procedure, when the filler composition is introduced into the region of repair, the resin of the composition penetrates to a degree the now exposed wood of the core to become securely adhesively bonded to the core.

A filler composition for filling the region of repair may be produced by mixing together a thermosetting resin binder and comminuted or ground cork.

In a preferred composition, the comminuted cork comprises from 3 to 10% by weight of the mixture, with the remainder being essentially thermosetting resin. The density of the cork is such that on addition of 6% by weight of cork to the mixture produces approximately a 22% volumetric increase. Cork thus is a relatively light material, and with a percentage of cork much exceeding the upper limit indicated, the amount of cork on a volume basis becomes so great as to impair the flowability of the composition. The use of lesser amounts of cork than that indicated increases the expense of the filler composition and results in loss of the beneficial characteristics sought to be obtained by the cork addition.

It has also been discovered that particle size of the comminuted cork is an important factor if the desired results are to be obtained. Thus, we have found it preferable to use cork having a particle size which passes through a 20 mesh screen but is retained on a 40 mesh screen. With cork particles sized within this range, a desired mottled effect is obtained in the repaired region with proper flow characteristics retained in the filler composition.

As a binder in the filler composition, it is contemplated that a thermosetting resin be utilized, which on setting adhesively bonds in place while uniting the cork particles together. Exemplary of the thermosetting resins that might be employed are the so-called polyester resins, which commonly are styrene type polyesters, and the so-called epoxy resins (epichlorohydrin bisphenol). To obtain suitable flowability in the filler composition at usual plant operating conditions, such resins should have a viscosity within range preferably of about 400 to 1,000 centipoise (cps.) at 77° F. Typifying the polyester resins that may be utilized, are the IC resins of Interchemical Corp., the MR resins of Celanese Corp. of America and the Polylite resins of Reichold Chemicals, Inc.

The following examples are included further to illustrate the instant invention.

A mixture was prepared of 100 parts polyester resin (Polylite 32–773 of Reichold Chemicals, Inc.), 6 parts comminuted Mediterranean cork having a particle size within the range above-indicated and a catalyst in the form of 1.5 parts of methyl ethyl ketone containing 3% peroxide.

The resin utilized had a viscosity (Brookfield at 77° F.), within a range of 600 to 800 cps. and a specific gravity of about 1.1. The filler composition made from the resin and cork mixture had approximately the flowability of honey enabling it to flow easily into a hole to effect a repair thereof.

The filler composition was utilized to fill knotholes in a plywood siding panel faced with cedar veneer approximately 1/16 inch thickness. Prior to filling knothole regions in such veneer, the glue line exposed by the open knotholes was routed out with conventional equipment. Fills were made by squeezing such filler composition from a squeeze bottle into the knothole regions. The mixture had a gel time of approximately 20 minutes to yield a hardened fill.

Exterior cedar siding panels of the type mentioned, then were worked over their surfaces by sanding them and wire brushing them to give the panels a textured appearance. In each instance, the finished panel so produced, had filled knothole regions which approximated in texture surrounding wood regions in the panel. In the case of the wire brushed panels, the knothole fills had a roughened appearance without sheen, and in the case of the sanded panels the regions had a smooth sanded appearance without sheen.

Figure 3:
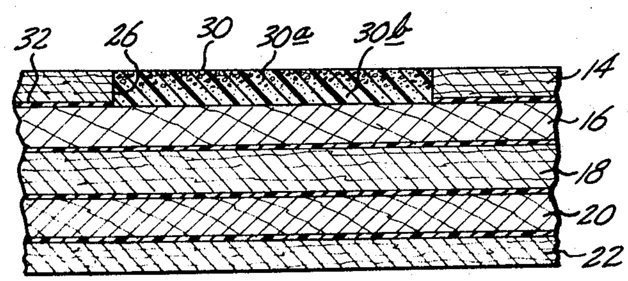
FIG. 3 is a cross-sectional view, taken along the line 3—3 in FIG. 2.

When panels with knothole regions so prepared were inspected, after cutting them through a filled region, it was noted that the filler composition on curing stratified with the production of a layer, indicated generally at 30*a* in FIG. 3, adjacent the outer surface of the veneer being repaired which was predominately cork and an underlying layer, indicated generally at 30*b*, bonded to the wood at the base of the prepared region which was relatively free of cork. The resin, therefore, produced a good seal with the underlying wood in the repaired region, with the cork particles, in a manner of speaking, having floated to the top of the filled region prior to hardening. The appearance of the filled region from the surface of the panel was one distinctly of cork. In the mixture, each cork particle had become covered with resin in making the filler composition, and this covering resin was sufficient to unite the cork particles firmly in the outer layer.

Cork, unlike materials such as sawdust, is a closed-cell material. As a consequence, in the filler composition which was prepared, there was no absorption of the resin binder into the cork particles. After hardening of the filler composition and on sanding, where the individual cork particles were abraded away, what was left at the surface of the panel was a region of cork texture rather than one of resin consistency. It is felt that this feature of the invention contributed to the lack of sheen which was noticed when repairs were made as contemplated.

In other examples, filler compositions were made employing a thermosetting resin binder such as an epoxy resin. The amount of comminuted cork present in the composition was varied within the range indicated above with the obtaining of highly satisfactory results when such compositions were employed in the repairing of panels.

As noted, the filler compositions were flowable and may be applied utilizing the usual squeeze bottles. This rendered the filler composition readily introducible into folds, cavities, or other regions of repair without the difficulties that result when paste-type fillers are employed.

While the above examples describe preferred filler compositions, method for using the filler and a repaired plywood panel produced using such filler and method, it should be apparent that changes and modifications may be made without departing from the spirit of the invention.

It is claimed and desired to secure by Letters Patent:

1. A plywood panel comprising an outer veneer forming one face on the panel and having an exposed surface and a back surface, said back surface being bonded to a core, said veneer having a hole therein opening to its exposed surface, said hole being filled with a filler which is a mixture of up to 10% by weight Mediterranean cork particles and the remainder essentially thermosetting resin, said cork particles in the filler being enveloped in a film of resin which is substantially unsorbed into the particles, the resin forming a continuous mass in nonparticle regions of the filler, the particles being stratified in the filler to have a greater concentration adjacent the exposed surface of the veneer than in an underlying region adjacent said core, said resin adhesively bonding the filler in said hole.

2. The panel of claim 1, wherein said panel has a glue line uniting the outer veneer to the core, said glue line has a cavity prepared therein substantially coextensive with the hole, and said filler fills said cavity and is bonded directly to said core.

3. The panel of claim 1, wherein said filler contains from 3 to 10% by weight cork particles.

4. The panel of claim 3, wherein said cork particles have a particle size which passes a 20 mesh screen.

5. The panel of claim 1, wherein said resin is a polyester resin.

6. In a plywood panel including an outer veneer having an exposed outer surface forming one face of the panel, which veneer is bonded to an underlying wood stratum in the panel, said veneer having a hole therein opening to the exposed outer surface thereof, a filler filling said hole which is a mixture of Mediterranean cork particles and thermosetting resin, the cork particles forming up to 10% by weight of the mixture, said filler being the cured product of a mixture of cork particles and uncured resin having a flowable liquid consistency which is deposited in said hole with such consistency, the work particles stratifying by rising to the surface of the filler during curing of the mixture, the cork particles being surrounded by resin in the filler with such resin substantantially unsorbed into the particles and forming a continuous mass in nonparticle regions, the cured resin in the filler adhesively bonding the filler in said hole.

7. The plywood panel of claim 6, wherein the cork particles have a size passing through a 20-mesh screen, and wherein the resin in the uncured state has a viscosity within the range of about 400 to 1,000 centipoise at 77° F.

(References on following page)

References Cited

UNITED STATES PATENTS

| | | | |
|---|---|---|---|
| 2,337,792 | 12/1943 | Yokell | 161—39 |
| 3,478,791 | 11/1969 | Elmendorf | 156—94 X |
| 3,200,030 | 8/1965 | Oita | 156—94 X |
| 2,419,614 | 4/1947 | Welch | 117—2 X |
| 2,690,986 | 10/1954 | Vollertsen | 156—94 |
| 3,098,053 | 7/1963 | Hallonquist | 117—2 X |
| 3,155,558 | 11/1964 | Clapp | 156—94 |
| 3,380,213 | 4/1968 | Hartman et al. | 156—94 X |
| 2,773,847 | 12/1956 | Pauley | 260—17.2 |
| 2,993,014 | 7/1961 | Schardt | 260—37 EP X |

CHARLES E. VAN HORN, Primary Examiner

U.S. Cl. X.R.

161—113, 162; 156—94, 98; 117—2 R; 144—310 R, 310 B; 260—37 R, 37 EP